US011969004B2

(12) United States Patent
Liu et al.

(10) Patent No.: US 11,969,004 B2
(45) Date of Patent: Apr. 30, 2024

(54) METHOD OF PREPARING PAPRIKA RED PIGMENT WITH LOW POLYCYCLIC AROMATIC HYDROCARBONS

(71) Applicants: Yihong Liu, Luohe (CN); Linzheng Li, Luohe (CN); Tianyi Pan, Luohe (CN); Yanjun Wen, Luohe (CN); Ziheng Jin, Luohe (CN)

(72) Inventors: Yihong Liu, Luohe (CN); Linzheng Li, Luohe (CN); Tianyi Pan, Luohe (CN); Yanjun Wen, Luohe (CN); Ziheng Jin, Luohe (CN)

(73) Assignee: HENAN ZHONGDA HENGYUAN BIOTECHNOLOGY STOCK CO., LTD., Luohe (CN)

( * ) Notice: Subject to any disclaimer, the term of this patent is extended or adjusted under 35 U.S.C. 154(b) by 150 days.

(21) Appl. No.: 17/328,502

(22) Filed: May 24, 2021

(65) Prior Publication Data

US 2021/0392927 A1 Dec. 23, 2021

(30) Foreign Application Priority Data

Jun. 22, 2020 (CN) ........................ 202010571312.3

(51) Int. Cl.

*A23L 5/20* (2016.01)
*A23L 5/40* (2016.01)
*A23L 19/00* (2016.01)
*B01D 11/02* (2006.01)
*B01D 11/04* (2006.01)
*B01D 15/08* (2006.01)
*C09B 61/00* (2006.01)
*C09B 67/54* (2006.01)

(52) U.S. Cl.

CPC *A23L 5/23* (2016.08); *A23L 5/27* (2016.08); *A23L 5/40* (2016.08); *A23L 19/09* (2016.08); *B01D 11/0234* (2013.01); *B01D 11/0288* (2013.01); *B01D 11/0492* (2013.01); *B01D 15/08* (2013.01); *C09B 61/00* (2013.01); *C09B 67/0096* (2013.01); *A23V 2002/00* (2013.01)

(58) Field of Classification Search

CPC ..... A23L 5/23; A23L 5/27; A23L 5/40; A23L 19/09; B01D 11/0234; B01D 11/0288; B01D 11/0492; B01D 15/08; B01D 11/0284; C09B 61/00; C09B 67/0096; A23V 2002/00

USPC .......................................................... 426/271

See application file for complete search history.

(56) References Cited

FOREIGN PATENT DOCUMENTS

| | | | | | |
|---|---|---|---|---|---|
| CN | 105767216 A | * | 7/2016 | | |
| CN | 106631953 A | * | 5/2017 | ........... | C07C 403/24 |
| CN | 107163618 A | * | 9/2017 | | |
| JP | 01123612 A | * | 5/1989 | | |
| JP | 2003119486 A | * | 4/2003 | | |

OTHER PUBLICATIONS

Machine Translation of Jin et al., CN 106631953, May 2017 (Year: 2017).*
Machine Translation of Cui et al., CN 107163618, Sep. 2017 (Year: 2017).*
Machine translation of Guo et al., CN 105767216, Jul. 2016 (Year: 2016).*
Machine translation of K. Watanabe JP 01123612, May 1989 (Year: 1989).*
Machine translation of Fujiwara et al., JP 2003119486, Apr. 2003 (Year: 2003).*

* cited by examiner

*Primary Examiner* — Lien T Tran
*Assistant Examiner* — Tynesha L McClain

(57) ABSTRACT

A method of preparing paprika red pigment with low polycyclic aromatic hydrocarbons includes (1) drying, crushing and granulating mature peppers to obtain pepper particles; (2) extracting the pepper particles with a vegetable oil in a rotocel extractor to obtain a paprika red pigment solution; (3) extracting the paprika red pigment solution with an ethanol solution in a liquid-liquid extractor to remove spicy substances; (4) running the paprika red pigment solution through a low-pressure chromatography column to remove polycyclic aromatic hydrocarbons; and (5) concentrating the paprika red pigment solution to obtain the paprika red pigment with low polycyclic aromatic hydrocarbons.

1 Claim, No Drawings

METHOD OF PREPARING PAPRIKA RED PIGMENT WITH LOW POLYCYCLIC AROMATIC HYDROCARBONS

This application claims priority to Chinese Patent Application No. 202010571312.3, filed on Jun. 22, 2020, which is incorporated by reference for all purposes as if fully set forth herein.

TECHNICAL FIELD

The invention belongs to the technical field of food additive, and specifically relates to a method of preparing paprika red pigment with low polycyclic aromatic hydrocarbons.

BACKGROUND TECHNIQUE

Paprika red pigment is a natural red pigment extracted from the peel of mature red pepper. The main components are capsanthin, capsorubin, (3-carotene, zeaxanthin etc. Its color intensity is 10 times stronger that of other pigments. It is widely used in food, beverage, cosmetics and medicine industries. It is recognized as the best class A red pigment in the world. Paprika red pigment is the bright red part of red pepper.

The traditional preparation process of paprika red pigment includes drying and crushing the peppers, using a solvent extraction to obtain a crude extract of paprika red pigment, then using alkaline solution or ethanol to remove the spicy substances, and distilling the solvent to out to obtain the paprika red pigment.

With the continuous improvement of people's awareness of food safety, the control of food additive safety indicators has become more and more stringent. At present, the management and control of polycyclic aromatic hydrocarbons (PAHs) and benzopyrene in paprika red pigment on the market has gradually attracted customer's attention. The PAHs content of the paprika red pigment produced by the traditional technology reaches more than 100 ppb, and the benzopyrene content reaches more than 30 ppb, which is far from meeting the requirements of PAHs<50 ppb and benzopyrene<10 ppb. If the content of polycyclic aromatic hydrocarbons is not effectively controlled, it will inevitably affect the future development of paprika red pigment industrialization. There is no relevant literature report on the control of polycyclic aromatic hydrocarbons in paprika red pigment, and it is impossible to achieve the purpose of effective separation of polycyclic aromatic hydrocarbons while ensuring a high yield of the paprika red pigment.

SUMMARY OF THE INVENTION

In one embodiment, a method of preparing paprika red pigment with low polycyclic aromatic hydrocarbons includes the following steps:

(1) drying, crushing and granulating mature peppers to obtain pepper particles;

(2) extracting the pepper particles with a vegetable oil in a rotocel extractor to obtain a paprika red pigment solution;

(3) extracting the paprika red pigment solution with an ethanol solution in a liquid-liquid extractor to remove spicy substances;

(4) running the paprika red pigment solution through a low-pressure chromatography column to remove polycyclic aromatic hydrocarbons; and (5) concentrating the paprika red pigment solution to obtain the paprika red pigment with low polycyclic aromatic hydrocarbons.

In another embodiment, in step (1), the mature peppers are dried, crushed, and granulated at 30-50° C.

In another embodiment, in step (2), the pepper particles are extracted with the vegetable oil at 40-50° C. and at a spraying volume of 1,000-1,500 L/h.

In another embodiment, in step (3), the ethanol solution is a 70% (v/v) ethanol solution.

In another embodiment, in step (3), the paprika red pigment solution is extracted continuously with the ethanol solution with a paprika red pigment solution flow rate of 0.5 $m^3/h$-1.5 $m^3/h$ and an ethanol solution flow rate of 1 $m^3/$–3 $m^3/h$.

In another embodiment, in step (4), the low-pressure chromatography column includes a filler that includes two or more selected from the group consisting of diatomaceous earth, white clay, kaolin clay, and activated carbon, the filler has a particle size of 20 mesh to 300 mesh, and a weight ratio of the filler and the pepper particles is 1:1-50.

In another embodiment, in step (5), the paprika red pigment solution is concentrated at 40° C.-100° C. and a pressure of 0.03 mPa to 0.06 mPa.

In another embodiment, in step (5), the paprika red pigment with low polycyclic aromatic hydrocarbons has a polycyclic aromatic hydrocarbons concentration of less than 15 mg/Kg.

In another embodiment, in step (5), the paprika red pigment with low polycyclic aromatic hydrocarbons has a benzopyrene concentration of less than 5 mg/Kg.

Compared with the prior art, the present invention has the following advantages. For the first time, the present invention uses a low pressure column chromatography method to remove polycyclic aromatic hydrocarbons from the paprika red pigment solution in a dynamic adsorption manner during the extraction process. The present application achieves the purpose of producing high-quality paprika red pigment with low polycyclic aromatic hydrocarbons, and at the same time, based on the low adsorption rate of the paprika red pigment, the method has no significant effect on the yield of the paprika red pigment. The invention adopts a physical adsorption method, which avoids the introduction of foreign substances or chemical treatments that cause changes in the properties of the product itself. In addition, the paprika red pigment solution is directly adsorbed and separated during the production process, which simplifies the process flow, is simple to operate, and has low process cost. It is suitable for industrialized production, and provides a reference for the control of natural pigment safety indicators.

DETAILED DESCRIPTION

Example 1 a) Mature red peppers were dried, crushed, and granulated at 30° C. to obtain pepper particles. 3,000 Kg pepper particles (color value: 16.6) were extracted with vegetable oil as extraction solvent in a horizontal continuous rotocel extractor. The extraction was conducted at 45° C. and a spray volume of 1,000 L/h to obtain a paprika red pigment solution. The paprika red pigment solution was continuously extracted with 70% ethanol in a liquid-liquid extractor at 45° C. and 200 r/min to remove spicy substances. The paprika red pigment solution has a flow rate of 1 $m^3/h$ and 70% ethanol has a flow rate of 2 $m^3/h$.

b) The paprika red pigment solution was adsorbed at a flow rate of 1 By/h on a chromatography column with a filler of 100 mesh activated carbon and 100 mesh diatomaceous earth mixed at a ratio of 5:1. The amount of the filler of the chromatography column is 30 kg. The eluent was collected, and polycyclic aromatic hydrocarbons were removed from the paprika red pigment solution.

c) The paprika red pigment solution was concentrated under reduced pressure 0.08 mPa at 60° C. to recover the extraction solvent. The paprika red pigment solution was further dried at 78° C. and 0.08 mPa for 3.5 hours to obtain 183.8 kg of paprika red pigment with low polycyclic aromatic hydrocarbons.

Example 2 a) Mature red peppers were dried, crushed, and granulated at 30° C. to obtain pepper particles. 3,000 Kg pepper particles (color value: 17.6) were extracted with vegetable oil as extraction solvent in a horizontal continuous rotocel extractor. The extraction was conducted at 45° C. and a spray volume of 1,000 L/h to obtain a paprika red pigment solution. The paprika red pigment solution was continuously extracted with 70% ethanol in a liquid-liquid extractor at 45° C. and 200 r/min to remove spicy substances. The paprika red pigment solution has a flow rate of 1 $m^3$/h and 70% ethanol has a flow rate of 2 $m^3$/h.

b) The paprika red pigment solution was adsorbed at a flow rate of 1.5 By/h on a chromatography column with a filler of 100 mesh activated carbon, 100 mesh activated white clay, and 100 mesh diatomaceous earth mixed at a ratio of 4:1:1. The amount of the filler of the chromatography column is 50 kg. The eluent was collected, and polycyclic aromatic hydrocarbons were removed from the paprika red pigment solution.

c) The paprika red pigment solution was concentrated under reduced pressure 0.07 mPa at 70° C. to recover the extraction solvent. The paprika red pigment solution was further dried at 74° C. and 0.07 mPa for 4 hours to obtain 170.9 kg of paprika red pigment with low polycyclic aromatic hydrocarbons.

Example 3 a) Mature red peppers were dried, crushed, and granulated at 30° C. to obtain pepper particles. 3,000 Kg pepper particles (color value: 16.9) were extracted with vegetable oil as extraction solvent in a horizontal continuous rotocel extractor. The extraction was conducted at 45° C. and a spray volume of 1,000 L/h to obtain a paprika red pigment solution. The paprika red pigment solution was continuously extracted with 70% ethanol in a liquid-liquid extractor at 45° C. and 200 r/min to remove spicy substances. The paprika red pigment solution has a flow rate of 1 $m^3$/h and 70% ethanol has a flow rate of 2 $m^3$/h.

b) The paprika red pigment solution was adsorbed at a flow rate of 1.5 By/h on a chromatography column with a filler of 200 mesh activated carbon and 80 mesh activated white mixed at a ratio of 7:1. The amount of the filler of the chromatography column is 70 kg. The eluent was collected, and polycyclic aromatic hydrocarbons were removed from the paprika red pigment solution.

c) The paprika red pigment solution was concentrated under reduced pressure 0.09 mPa at 74° C. to recover the extraction solvent. The paprika red pigment solution was further dried at 74° C. and 0.08 mPa for 3 hours to obtain 194.1 kg of paprika red pigment with low polycyclic aromatic hydrocarbons.

Comparative Example 1 a) Mature red peppers were dried, crushed, and granulated at 30° C. to obtain pepper particles. 3,000 Kg pepper particles (color value: 16.8) were extracted with vegetable oil as extraction solvent in a horizontal continuous rotocel extractor. The extraction was conducted at 45° C. and a spray volume of 1,000 L/h to obtain a paprika red pigment solution. The paprika red pigment solution was continuously extracted with 70% ethanol in a liquid-liquid extractor at 45° C. and 200 r/min to remove spicy substances. The paprika red pigment solution has a flow rate of 1 $m^3$/h and 70% ethanol has a flow rate of 2 $m^3$/h.

b) The paprika red pigment solution was concentrated under reduced pressure 0.08 mPa at 60° C. to recover the extraction solvent. The paprika red pigment solution was further dried at 78° C. and 0.09 mPa for 3 hours to obtain 188.9 kg of paprika red pigment.

Comparative Example 2

3,000 Kg mature pepper particles (color value: 16.5) were extracted with vegetable oil as extraction solvent in a horizontal continuous rotocel extractor. The extraction was conducted at 40° C. and a spray volume of 1,500 L/h to obtain a paprika red pigment solution.

The paprika red pigment solution was concentrated under reduced pressure 0.06 mPa to obtain 250.86 kg concentrated paprika red pigment solution. The concentrated solution was extracted with 500 kg of 70% ethanol, and then dried at 75° C. and 0.08 mPa for 3.5 hours to obtain 190.6 kg of paprika red pigment.

The paprika red pigment prepared in the Examples and Comparative Examples was tested. The absorbance was detected according to the method of GB/10783-2008. The absorbance ratio was a ratio of A470 nm to A454 nm in the same paprika red pigment solution. PAHs were detected by HPLC. The test results are shown in Table 1.

TABLE 1

Test results of paprika red pigment prepared in Examples 1 to 3 and Comparative Examples 1-2

| | Experimental Nos. | | | | |
|---|---|---|---|---|---|
| Test Results | Ex. 1 | Ex. 2 | Ex. 3 | Comp. Ex. 1 | Comp. Ex. 2 |
| Color value | 258.2 | 287.6 | 246.7 | 255.6 | 239.7 |
| Absorbance | 0.986 | 0.991 | 0.982 | 0.990 | 0.978 |
| PAHs, mg/kg | 9.1 | 12.6 | 10.4 | 96.3 | 89.2 |
| benzopyrene, mg/kg | 4.6 | 2.9 | 1.9 | 43.7 | 62.1 |
| Yield % | 95.3 | 93.1 | 94.4 | 95.8 | 92.3 |

As shown in Table 1, the paprika red pigment in the example and the comparative example are close in color value and yield, but the PAHs and benzopyrene contents in the examples 1-3 are significantly lower than those in the comparative examples 1-2. The method of the present application has a good removal effect on PAHs and benzopyrene while ensuring a high yield of the paprika red pigment.

Finally, it should be noted that the above-mentioned embodiments are only examples for clearly illustrating the present invention, rather than limiting the implementation manners. For those of ordinary skill in the art, other changes or changes in different forms can be made on the basis of the above description. There is no need and cannot give an exhaustive list of all implementation methods. The obvious changes or modifications derived from this are still within the protection scope of the present invention.

The invention claimed is:

1. A method of preparing paprika red pigment consisting of:

(1) drying, crushing and granulating mature peppers to obtain pepper particles;

(2) extracting the pepper particles with a vegetable oil in a rotocel extractor to obtain a paprika red pigment vegetable oil solution;

(3) extracting the paprika red pigment vegetable oil solution with an ethanol solution in a liquid-liquid extractor to remove spicy substances;

(4) running the paprika red pigment vegetable oil solution through a chromatography column to remove polycyclic aromatic hydrocarbons; and (5) concentrating the paprika red pigment vegetable oil solution to obtain the paprika red pigment, wherein in step (1), the mature peppers are dried, crushed, and granulated at 30° C.;

wherein in step (2), the pepper particles are extracted with the vegetable oil at 40° C. and at a spraying volume of 1,000 L/h;

wherein in step (3), the paprika red pigment vegetable oil solution is extracted continuously with the ethanol solution with a paprika red pigment vegetable oil solution flow rate of 1 $m^3$/h and an ethanol solution flow rate of 2 $m^3$/h, and the ethanol solution is a 70% (v/v) ethanol solution;

wherein in step (4), the chromatography column includes a filler that includes 200 mesh activated carbon and 80 mesh activated white clay mixed at a weight ratio of 7:1, and a weight ratio of the filler and the pepper particles is 7:30; and wherein in step (5), the paprika red pigment vegetable oil solution is concentrated at 74° C. and a pressure of 0.09 mPa, the paprika red pigment has a polycyclic aromatic hydrocarbons concentration of 10.4 mg/Kg, and the paprika red pigment has a benzopyrene concentration of 1.9 mg/Kg.

* * * * *